J. RICHARDSON.
FOWL FEEDER.

No. 101,766.

Patented Apr. 12, 1870.

Witnesses
S. A. Noyes
Fred Thomas

Inventor
Joseph Richardson by
H. W. Searles, atty.

United States Patent Office.

JOSEPH RICHARDSON, OF BALLSTON SPA, NEW YORK.

Letters Patent No. 101,766, dated April 12, 1870.

---

IMPROVEMENT IN FOWL-FEEDERS.

---

The Schedule referred to in these Letters Patent and making part of the same

---

*To all whom it may concern:*

Be it known that I, JOSEPH RICHARDSON, of Ballston Spa, in the county of Saratoga and State of New York, have invented a new and useful Improvement in Fowl-Feeders; and I do hereby declare that the following is a full and exact description of the same, reference being had to the accompanying drawings and to the letters of reference marked thereon.

This invention relates to a novel device for providing fowls with food and water, which is so arranged that they are enabled to supply themselves as they may wish, for an unlimited period.

It novelty consists mainly in certain details of construction, whereby the perfect operation of the apparatus is insured, the details of which will be fully described hereinafter.

In the drawings—

Figure 1:
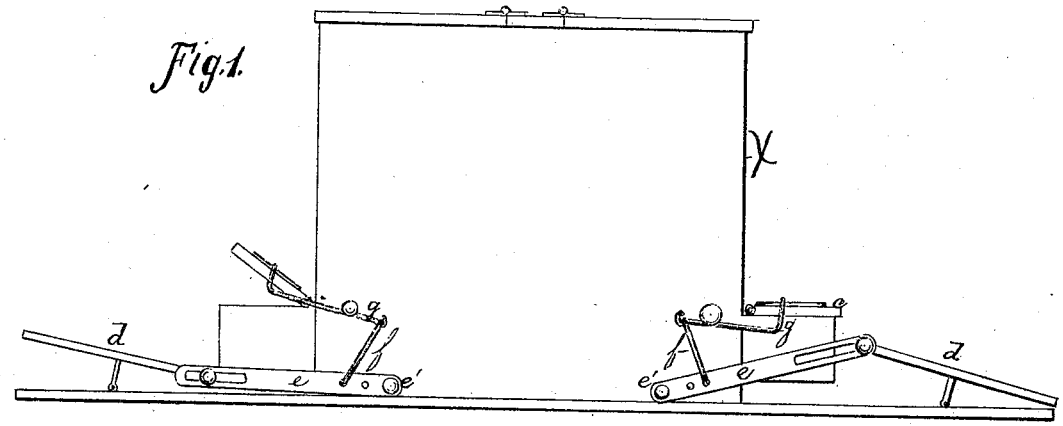
Figure 1 is a side elevation of my improved fowl-feeder.
Figure 2:
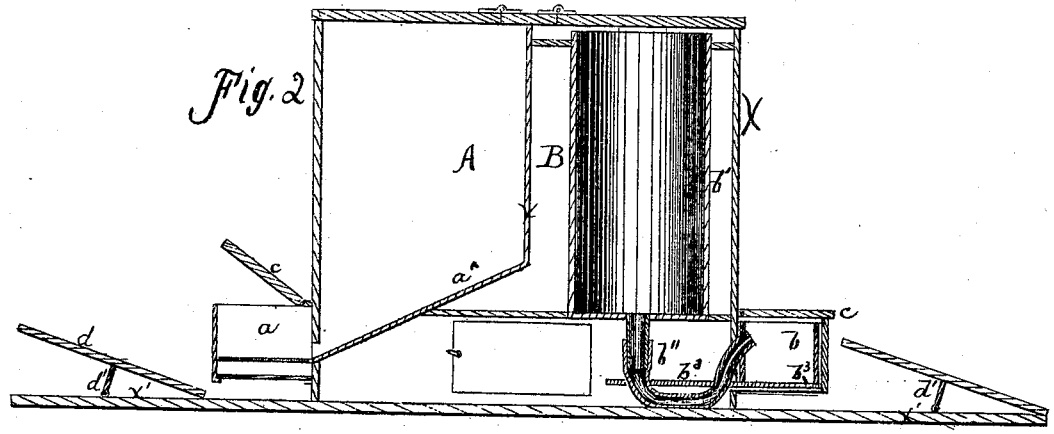
Figure 2 is a central longitudinal vertical section.
Figure 3:
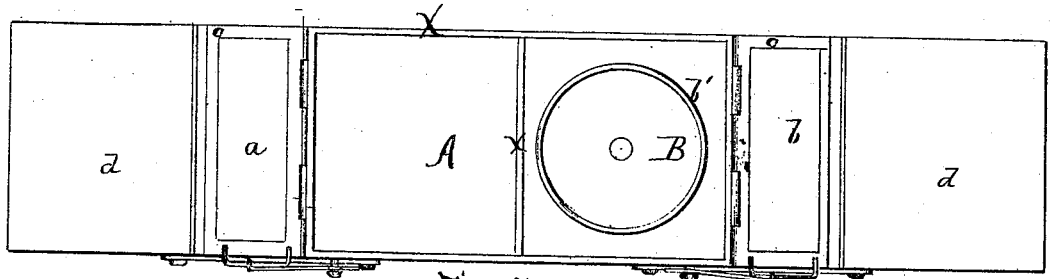

Figure 3, a plan view with the top removed.

To enable others skilled in the art to make and use my invention, I will now proceed to describe its construction and operation.

X represents the case of the feeder, which is divided into two chambers, A B, by means of the partition $x$, as shown.

In the chamber A the food is placed, and in the chamber B the water.

$a$ and $b$ represent troughs, from which the fowls feed, and into which the food and water are discharged from the store-chambers A B.

To insure the discharge of the grain in regular and proper quantities to the trough $a$ from the store-chamber A, the latter is provided with an inclined bottom, $a'$, which conducts the grain to the opening between the two, as clearly shown in the drawing.

By means of this arrangement, the trough $a$ is filled from the chamber A, and so long as it remains full no more can pass into it, as the pressure through the small opening is not sufficient to force the grain out of the trough, but whenever the grain is lowered in the trough below a certain limit a new supply again pours into the trough and refills it.

The devices for regulating the supply of water are somewhat differently arranged, and will now be described.

$b'$ represents a keg in which the water is placed, which is connected by means of a flexible tube, $b''$, with the trough $b^3$. This inner trough is not fixed, but is free to move vertically.

The tube through which the water is received is so arranged as to pass under the trough itself, or a projection from it, in order that the weight of the latter, when filled with water, may compress the tube and shut off the supply.

As the water is removed by the fowls, the trough is lifted by the tube and the water again flows in. If desired, an iron or other suitable pipe may be used, with a valve operated in any suitable manner by the movement of the trough.

To protect the contents of the troughs $a\ b^3$, I provide the hinged covers $c\ c$, which are partially composed of glass, in order that the contents of the troughs may be seen by the fowls.

For the purpose of opening these covers, I provide the treadles $d\ d$ with the projection $d'$, which are pivoted to the base X', as shown. The outer ends of these treadles are weighted.

$e$ represents a slotted lever, pivoted at $e'$, which has attached to it, near its fixed end, the connecting-rod $f$, by means of which latter it is united to the short arm of lever $g$. The long arm of the lever $g$ is attached to the hinged cover $c$.

From this description it will be evident that unless the treadles are disturbed, the covers must remain closed, for the weighted end of the treadle being depressed forces up the rear end of the lever $b$ by means of the connections described, and the cover therefore is held down.

If, however, the position of the treadle is changed, and the inner end is depressed, the operation of the lever is such that the covers are opened.

From this description the operation of my device will be easily understood.

The food and water are supplied from the store-chambers to the feeding-troughs as fast as needed, and no faster. The fowls, observing the food and water through the glass of the covers, advance upon the treadles, depress their inner ends, and thus open the covers.

As soon as they pass off from the treadles, however, the covers are closed. If desired, the grain-trough may be provided with a sieve, through which the dirt can pass, a drawer being arranged beneath to receive it.

The apparatus herein described is simple in construction and effective in operation. It is not liable to get out of order, and by its means fowls can be fed without personal care for any reasonable length of time. The feeder may be used of any desired size or material.

Having thus fully described my invention,

What I claim as new, and desire to secure by Letters Patent, is—

1. The trough $b^3$, in combination with the flexible tube $b''$, when arranged as described, for the purpose set forth.

2. The apparatus described, consisting of the chambers A B, troughs $a\ b$ with transparent covers $c$, tube $b'$, and treadles $d\ d$, with their connections, the whole being constructed and arranged as described, for the purpose set forth.

This specification signed and witnessed this 19th day of July, 1869.

JOSEPH RICHARDSON.

Witnesses:
M. V. B. WHITE,
SETH WHALEN.